United States Patent [19]

Shinozaki

[11] Patent Number: 5,568,135
[45] Date of Patent: Oct. 22, 1996

[54] REMOTE CONTROL METHOD AND UNIT FOR A RADIO UNIT

[75] Inventor: Yutaka Shinozaki, Kawasaki, Japan

[73] Assignee: Fujitsu Limited, Kanagawa, Japan

[21] Appl. No.: 142,212

[22] Filed: Oct. 25, 1993

[30] Foreign Application Priority Data

Oct. 26, 1992 [JP] Japan .................................. 4-287587

[51] Int. Cl.$^6$ ................................................. G05B 23/02
[52] U.S. Cl. ............................... 340/825.06; 340/825.16; 371/54.1; 455/67.1
[58] Field of Search ......................... 340/825.06, 825.16; 455/67.1, 62.3, 62.7, 68; 371/16.3, 57.1

[56] References Cited

U.S. PATENT DOCUMENTS 4,184,118  1/1980  Cannalte et al. .................... 340/825.06

*Primary Examiner*—Brian Zimmerman
*Assistant Examiner*—Edward Merz

[57] ABSTRACT

A remote control method and system controlling a radio unit so as to readily specify a portion where a failure occurs, and to quickly take recovery measures against the failure includes a supervisory unit located in the vicinity of the radio unit. If abnormality occurs in the operation of the supervisory unit, an alarm signal detecting unit monitors an operation of the supervisory unit, and transmits the alarm signal to an abnormal processing signal outputting unit through a communication control line. When the abnormal processing signal outputting unit receives the alarm signal from the alarm detecting unit, it transmits the abnormal processing signal to an abnormal processing unit through the communication control line. When the abnormal processing unit receives the abnormal processing signal from the abnormal processing signal outputting unit, it executes abnormal processing in accordance with the received abnormal processing signal. Thus, if the abnormal processing signal outputting unit receives an alarm signal from the alarm detecting unit, no disconnection occurs in the communication control line. If abnormality occurs in the supervisory unit, it can be readily specified by a remote control unit.

7 Claims, 6 Drawing Sheets

REMOTE CONTROL METHOD AND UNIT FOR A RADIO UNIT

BACKGROUND OF THE INVENTION

(1) Field of the Invention

The present invention relates to a remote control method and a unit for a radio unit, which execute remote control of a transmission power or the like, and in particular, to a remote control method and a unit for a radio unit including a supervisory control unit which is located in the vicinity of the radio unit, and monitors and controls an operating state of the radio unit, and a remote control unit which is connected to the supervisory control unit through a communication control line, and being controlled by means of the remote control unit through the supervisory control unit.

(2) Description of the Related Art

There is a radio unit which is divided into an outdoor unit located together with an antenna to avoid having a waveguide lengthened, and an indoor unit connected to the outdoor unit by means of a coaxial cable. According to such a radio unit, a remote control unit, which is located on the outdoor unit, controls a transmission power or the like of the outdoor unit.

As shown in FIG. 1, a conventional radio unit comprises an outdoor unit (referred to as "ODU" (Out-Door unit) hereinafter) 60, and an indoor unit (referred to as "IDU" (In-Door Unit) hereinafter) 65. The ODU 60 is composed of an ODU communication device 61, and an ODU-SV (Supervisor) section 62 which monitors and controls the ODU communication device 61. On the other hand, the IDU 65 is composed of an IDU communication device 66, and an IDU-SV (Supervisor) section 67 which monitors and controls the IDU communication device 66, and controls the ODU communication device 61 via the ODU-SV section 62.

The IDU communication device 66 comprises a DPU (Digital Processor Unit) 66a which executes an interface signal processing with low-order devices for frame synchronization, multiplex/separate or the like, a MODEM 66b which executes modulation/demodulation, and an IF section 66c which amplifies an intermediate frequency. The ODU communication device 61 comprises an IF section 61a which amplifies an intermediate frequency, and a RF section 61b which amplifies a high frequency. The IF sections 66c and 61a are connected to each other by means of main signal communication lines 71a and 71b composed of a coaxial cable, and transmission and reception signals are transmitted therethrough. The RF section 61b is connected to an antenna 70, and microwaves are transmitted and received between this antenna 70 and another base station.

The ODU-SV section 62 is composed of a supervisory control section 62a which monitors a voltage of each section of the ODU communication device 61, occurrence of an alarm, a reception power, and executes a transmission power control, and a communication control section 62b which controls the communication between the supervisory control section 62a and the IDU-SV section 67. The IDU-SV section 67 is composed of a supervisory control section 67a which monitors and controls the IDU communication device 66, and the ODU communication device 61 through the supervisory control section 62a, and a communication control section 67b which controls the communication between the supervisory control sections 67a and 62a. These communication control sections 62b and 67b are connected by means of communication control lines 72a and 72b, and a serial signal is transmitted and received between both.

In the case where there is a failure such that a serial signal is not transmitted from the communication control section 67b of the IDU-SV section 67, it seems that the cause results in disconnection of the communication control line 72b, or in a failure occurring in the ODU-SV section 62. However, according to a conventional radio unit, it is impossible to make a decision which failure occurs in the IDU 65.

In order to specify a portion where a failure occurs, it is required to actually go to an antenna located at a high place, and to check the ODU-SV section 62. For this reason, the cause of failure can not be quickly found and removed, and there is the possibility of causing a lowering of communication service and an enlargement of the failure.

SUMMARY OF THE INVENTION

An object of the present invention is to provide a remote control method and a unit for a radio unit, which readily specify a portion where a failure occurs, and quickly take recovery measures against the failure.

To achieve the above object, the present invention provides a remote control method for a radio unit, including a supervisory control unit which is located in the vicinity of the radio unit, and monitors and controls an operating state of the radio unit, and a remote control unit which is connected to the supervisory control unit through a communication control line, and being controlled by means of the remote control unit through the supervisory control unit. According to the radio remote control method, an alarm signal indicative of abnormality of an operation of the supervisory control unit is transmitted from the supervisory control unit to the remote control unit through communication control lines, and it is made a decision whether abnormality occurs in the supervisory control unit and communication control lines on the basis of the alarm signal transmitted to the remote control unit.

Further, according to such a remote control method for a radio unit, when the alarm signal indicative of abnormality of an operation of the supervisory control unit is transmitted from the supervisory control unit to the remote control unit through communication control lines, in accordance with a transmission of the alarm signal, the remote control unit transmits an abnormality processing signal to the supervisory control unit through the communication control line, and an abnormality processing is effected in accordance with the transmitted abnormality processing signal.

Also, there is provided a remote control unit for carrying out the remote control method described above.

In addition, there is provided a remote control method for a radio unit, including a supervisory control unit which is located in the vicinity of the radio unit, and monitors and controls an operating state of the radio unit, and a remote control unit which is located away from the supervisory control unit, and connected to the supervisory control unit through a communication control line, and being controlled by means of the remote control unit on the basis of monitoring data of the radio unit transmitted from the supervisory control unit through the supervisory control unit. According to such a remote control method for a radio unit, if monitoring data of the radio unit is not transmitted from the supervisory control unit to the remote control unit through the communication control line, the remote control unit transmits a test pattern signal to the supervisory control unit through the communication control line. Then, the supervisory control unit transfers by return the transmitted test pattern signal to the remote control unit through the communication control line, and the returned test pattern signal is detected by means of the remote control unit. If the returned test pattern signal is detected, a decision is made that no abnormality occurs at least in the communication control line.

Also, there is provided a remote control unit for carrying out the remote control method described above.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The first and second embodiments according to the present invention will be schematically described below.

Figure 1:
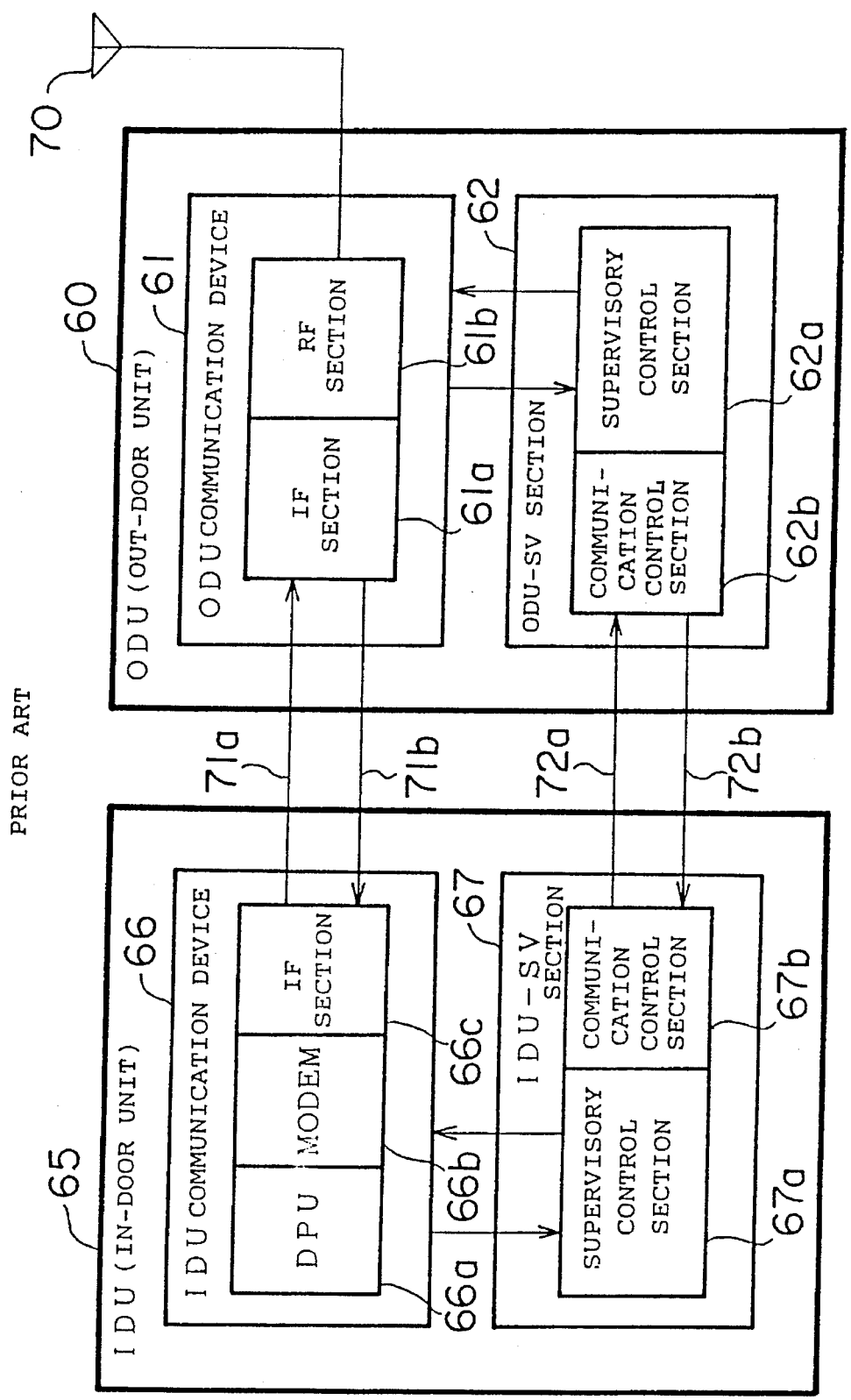
FIG. 1 is a block diagram of a conventional remote control unit for a radio unit.
Figure 2:
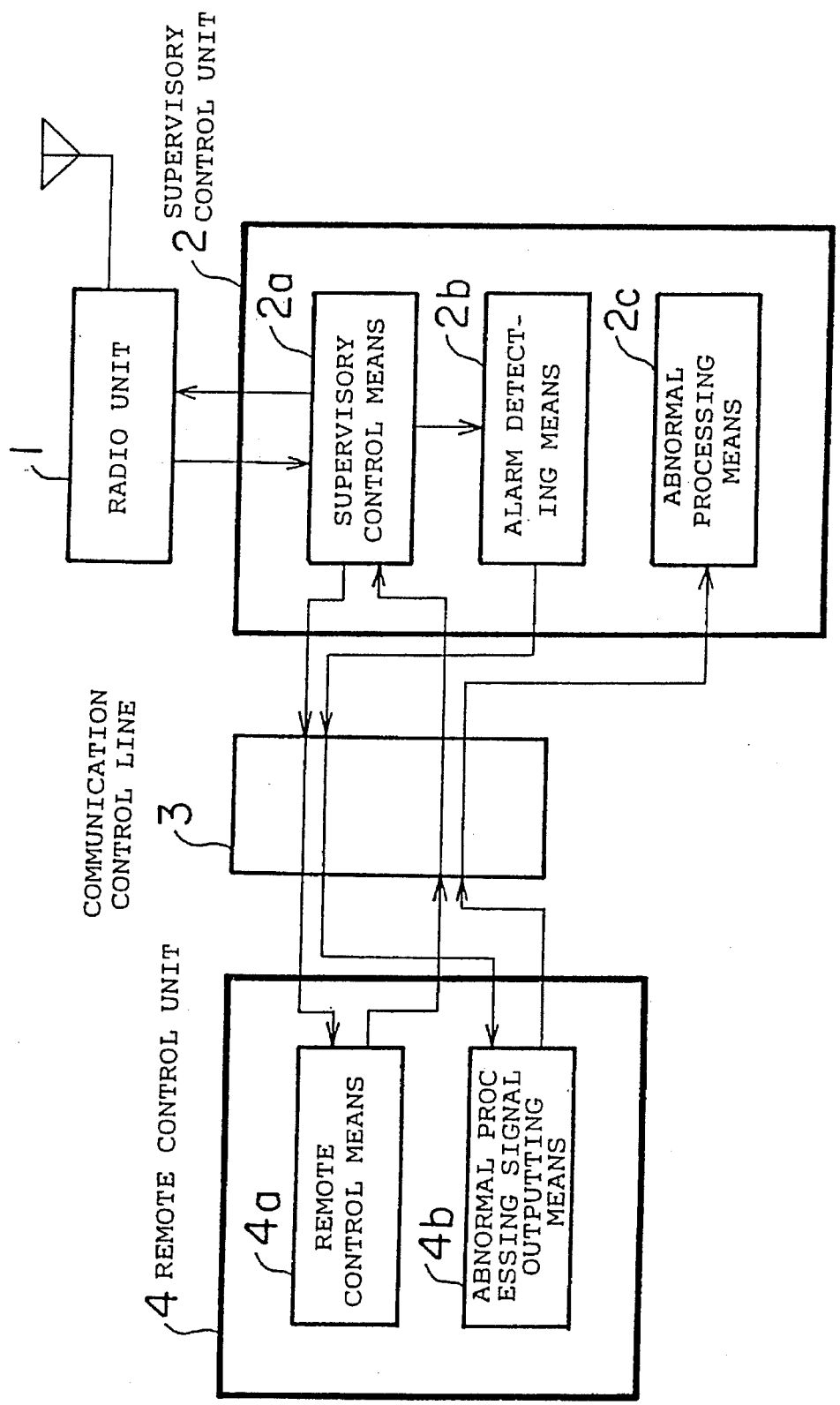
FIG. 2 is a block diagram schematically showing a first embodiment according to the present invention.

FIG. 2 is a block diagram schematically showing the first embodiment according to the present invention. In the figure, a supervisory control unit 2, which monitors and controls an operating state of a radio 1, comprises supervisory control means 2a, alarm detecting means 2b, and abnormality processing means 2c. A remote control unit 4, which is connected to the supervisory control unit 2 through a communication control line 3, comprises remote control means 4a and abnormality processing signal outputting means 4b.

The supervisory control means 2a is located in the vicinity of the radio 1, and monitors and controls an operating state of the radio 1. The alarm detecting means 2b monitors an operation of the supervisory control means 2a, and transmits an alarm signal via the communication control line 3 when the supervisory control means 2a falls in an abnormal operation state. The abnormality processing means 2c receives an abnormality processing signal from the abnormality processing signal outputting means 4b, and executes a process for the abnormality in accordance with the received abnormality processing signal.

The remote control means 4a is located away from the supervisory control means 2a, and data indicative of an operating state of the radio 1 is transmitted to the remote control means via the communication control line 3. Further, the remote control means prepares a signal for controlling the radio 1 on the basis of the transmitted data, and transmits the signal to the supervisory control means 2a via the communication control line 3. The abnormality processing signal outputting means 4b receives an alarm-signal transmitted from the alarm detecting means 2b, and transmits the abnormality processing signal to the abnormality processing means 2c via the communication control line 3.

In the first embodiment constituted as above, the alarm detecting means 2b first monitors an operation of the supervisory control means 2a. If there is abnormality in the operation of the supervisory control means 2a, the alarm detecting means 2b transmits an alarm signal to the abnormality processing signal outputting means 4b via the communication control line 3. When the abnormality processing means 4b receives the alarm signal from the alarm detecting means 2b, it transmits the abnormality processing signal to the abnormality processing means 2c via the communication control line 3. Then, when the abnormality processing means 2c receives the abnormality processing signal from the abnormality processing signal outputting means 4b, it executes a process for the abnormality in accordance with the received abnormality processing signal.

As described above, if the abnormality processing signal outputting means 4b receives the alarm signal from the alarm detecting means 2b, no disconnection occurs in the communication control line 3. If abnormality occurs in the supervisory control unit 2, the remote control unit 4 can readily specify the abnormality. In addition, if abnormality occurs in the supervisory control unit 2, the abnormality processing means 2c receives an abnormality processing signal for instructing measures from the abnormality processing signal outputting means 4b, and quickly takes recovery measures corresponding to this signal, for example, the provision of logging information, a reset to the initial state, or the like.

Further, in the case where the data indicating the operating state of the radio 1 is not transmitted to the remote control means 4a via the communication control line 3 from the supervisory control means 2a, and the abnormality processing signal outputting means 4b does not receive an alarm signal from the alarm detecting means 2b, it can be readily found that a disconnection occurs in the communication control line 3.

Figure 3:
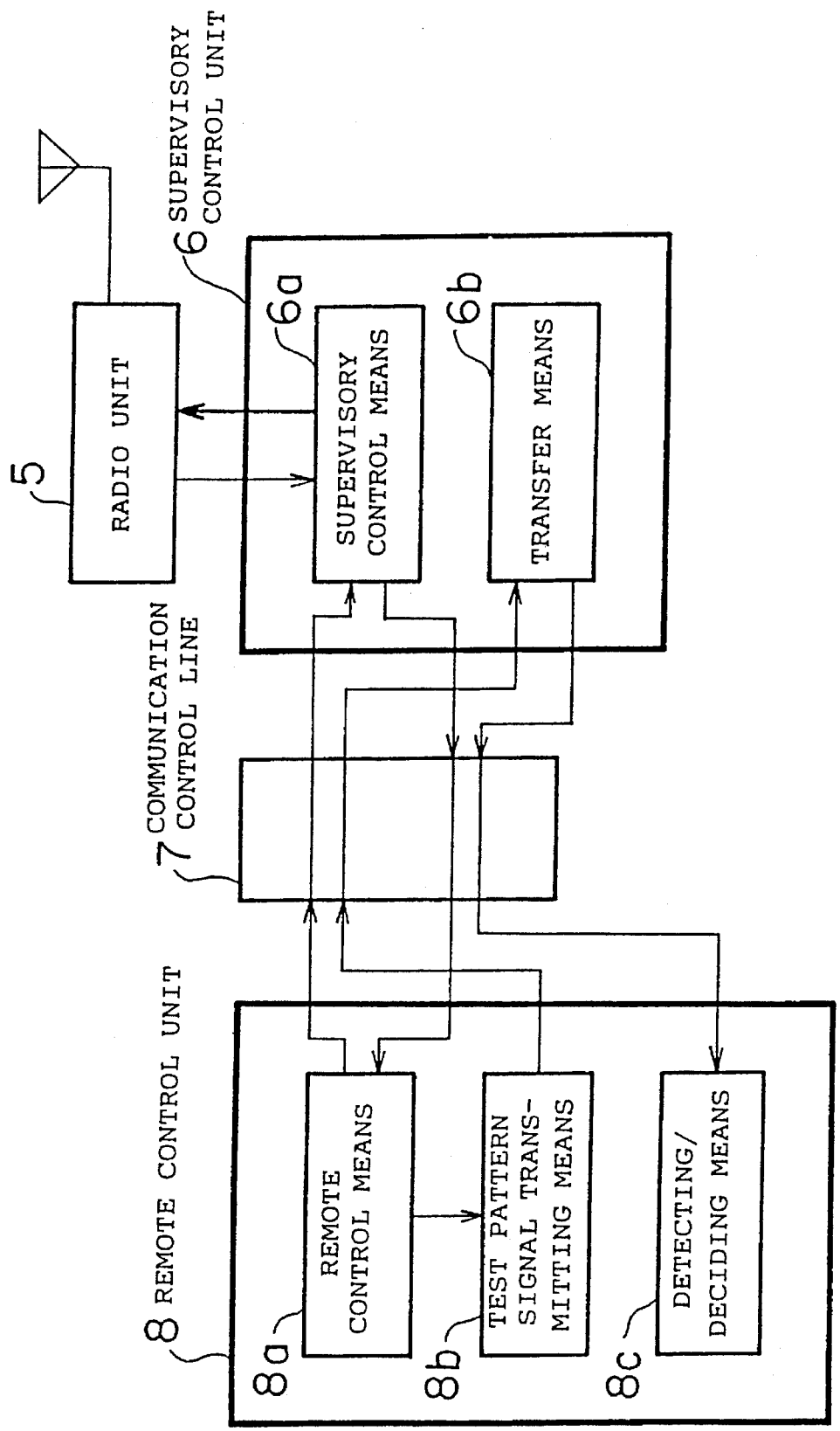
FIG. 3 is a block diagram schematically showing a second embodiment according to the present invention.

FIG. 3 is a block diagram schematically showing the second embodiment according to the present invention. In the figure, a supervisory control unit 6 comprises supervisory control means 6a and transfer means 6b. A remote control unit 8 comprises remote control means 8a, test pattern transmitter means 8b, and detecting/deciding means 8c.

The supervisory control means 6a is located in the vicinity of a radio 5, and monitors and controls an operating state of the radio 5. The transfer means 6b receives a test pattern signal transmitted from the test pattern signal transmitter means 8b, and transfers it to the detecting/deciding means via a communication control line 7.

The remote control means 8a is located away from the supervisory control means 6a, and data indicative of an operating state of the radio 5 is transmitted to the remote control means via the communication control line 7. Further, the remote control means 8a prepares a signal for controlling the radio 5 on the basis of the transmitted data, and transmits it to the supervisory control means 6a via the communication line 7 for a control. The test pattern signal transmitter means 8b transmits the test pattern signal to the transfer means via the communication control line 7 when the data indicative of the operating state of the radio 5 is not transmitted from the supervisory control means 6a to the remote control means 8a via the communication control line 7. The detecting/deciding means 8c monitors the test pattern signal returned from the transfer means 6b, and makes a decision that no abnormality occurs at least in the communication control line 7 when detecting the returned test pattern signal.

In the second embodiment constituted as above, first, the test pattern signal transmitter means 8b transmits the test pattern signal to the transfer means 6b via the communication control line 7 when the data indicative of the operating state of the radio 5 is not transmitted from the supervisory control means 6a to the remote control means 8a via the communication control line 7. When the transfer means 6b receives the test pattern signal from the test pattern signal transmitter means 8b, it returns the test pattern signal via the communication control line 7, and transfers the signal to the detecting and deciding means 8c monitors the test pattern signal returned from the transfer means 6b, and makes a decision that no abnormality occurs at least in the communication control line 7 when detecting the returned test pattern signal.

As described above, if the detecting and deciding means 8c detects the test pattern signal, no disconnection occurs in the communication control line 7. Therefore, the remote control unit 8 can readily specify the abnormality in the supervisory control unit 6. In addition, in the case where the detecting/deciding means 8c can not detect the returned test pattern signal regardless of a transmission of the test pattern signal from the test pattern signal transmitter means 8b, the remote control unit 8 can readily specify a disconnection occurring in the communication control line 7.

The first and second embodiments of the present invention will be described below in detail.

Figure 4:
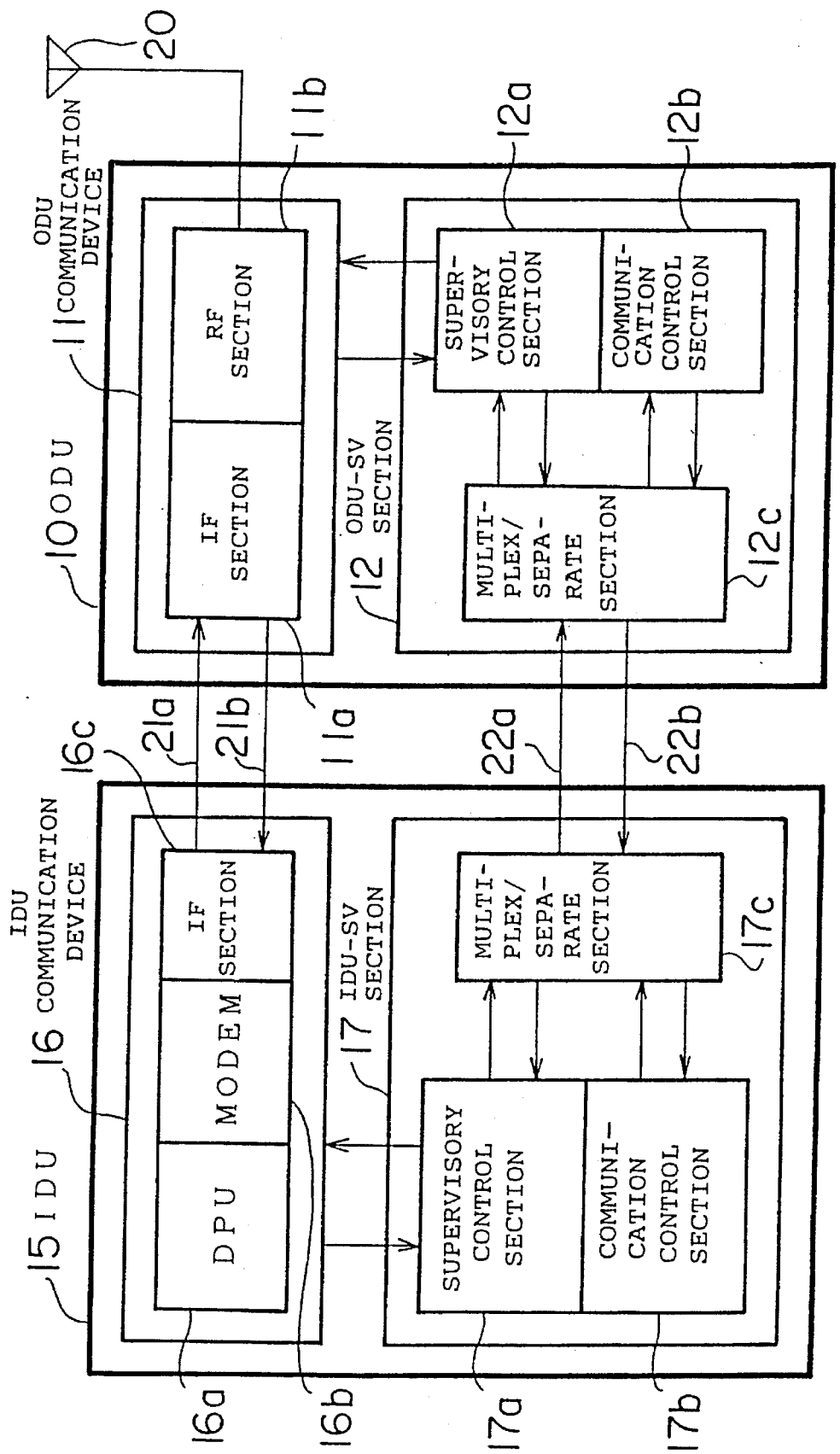
FIG. 4 is a block diagram of the remote control unit for a radio unit according to the first embodiment.

FIG. 4 is a block diagram of the remote control unit of the radio unit, which is the first embodiment. The radio unit comprises an outdoor unit (referred to as "ODU" (Out-Door Unit) later) 10, which is located together with an antenna, and an indoor unit (referred to as "IDU" (In-Door Unit) later) 15, which is located away from the ODU 10. The ODU 10 is composed of an ODU communication device 11 which mainly transmits and receives a high-frequency signal, and an ODU-SV (Supervisor) section 12 which monitors and controls the ODU communication device 11. The IDU 15 is composed of an IDU communication device 16 which controls an interface with low-order devices of the transmission/reception signal, modulation/demodulation, amplification of an intermediate-frequency signal and the like, and an IDU-SV (Supervisor) section 17, which monitors and controls the IDU communication device 16, and executes a control of the ODU communication device 11 through the ODU-SV section 12.

The IDU communication device 16 is composed of a DPU (Digital Processor Unit) 16a which executes an interface signal processing of low-order devices for frame synchronization, multiplex/separate, or the like, a MODEM 16b which executes modulation/demodulation, and an IF section 16c which amplifies an intermediate frequency. On the other hand, the ODU communication device 11 is composed of an IF section 11a which executes modulation/demodulation, and a RF section 11b which amplifies high frequency. The IF sections 16c and 11a are connected to each other through main-signal communication lines 21a and 21b composing of a coaxial cable, and transmission and reception signals are sent to the IF sections. The RF section 11b is connected to the antenna 20, and microwaves are transmitted and received between other base stations by means of the antenna 20.

The ODU-SV section 12 is composed of a supervisory control section 12a, a communication control section 12b, and a multiplex/separate section 12c. The supervisory control section 12a executes monitoring operation for voltage of each section in the ODU communication device 11, occurrence of an alarm, receiving power, a control of transmitting power or the like according to a control of a supervisory control section 17a which will be described later. More specifically, controled items include setting of transmission/reception frequency, setting of a transmitting level, a RF loop control which shifts a transmission frequency to a reception frequency, and which returns the frequency in order to confirm an operation of a transmission/reception circuit, a transmitting power-on control for determining whether or not the transmitting power should be actually outputted. On the other hand, monitored items include a reception level, a transmission level, a level of an IF signal transmitted from the IF section 16c of the IDU communication device 16 to the IF section 11a of the ODU communication device 11, an alarm indicative of divergence from a preset value of the transmission level, an alarm indicative of divergence from a preset value of the reception level, an alarm indicative of divergence from a preset value of an IF signal level transmitted from the IF section 16c of the IDU communication device 16 to the IF section 11a of the ODU communication device 11.

The communication control section 12b interfaces a transmission/reception of a serial signal between the supervisory control section 12a and the supervisory control section 17a of the IDU-SV section 17. This serial signal includes monitoring and controlling data. The supervisory control section 12a has a function of monitoring its own operation, and outputs a CPU alarm signal when abnormality occurs therein.

The multiplex/separate section 12c multiplexes the CPU alarm signal from the supervisory control section 12 to serial monitoring data from the communication control section 12b, and transmits it to the IDU-SV section 17. Conversely, the multiplex/separate section 12c separates the multiplex signal transmitted from the IDU-SV section 17, and transmits serial control data to the communication control section 12b. Further, it transmits an off-line control signal which will be described later or a CPU reset control signal to the supervisory control section 12a. Incidentally, detailed configuration of the ODU-SV section 12 will be later described with reference to FIG. 5.

The IDU-SV section 17 is composed of a supervisory control section 17a, a communication control section 17b, and a multiplex/separate section 17c. The supervisory control section 17a monitors and controls the IDU communication device 16, and further monitors and controls the ODU communication device 11 through the supervisory control section 12a of the ODU-SV section 12. The communication control section 17b controls the communication between the supervisory control section 17a and the supervisory control section 12a of the ODU-SV section 12. The multiplex/separate section 17c multiplexes a serial control data from the communication control section 17b and an offline/CPU reset control signal from the supervisory control section 17a, and transmits them to the multiple/separate section 12c of the ODU-SV section 12. Conversely, the multiplex/separate section 17c separates the multiplexed signal transmitted from the multiplex/separate section 12c, and transmits a serial monitoring data to the communication control section 17b and a CPU alarm signal to the supervisory control section 17a. The multiplex/separate sections 17c and 12c are connected by means of communication control lines 22a and 22b, and serial signals are transmitted and received between them.

Figure 5:
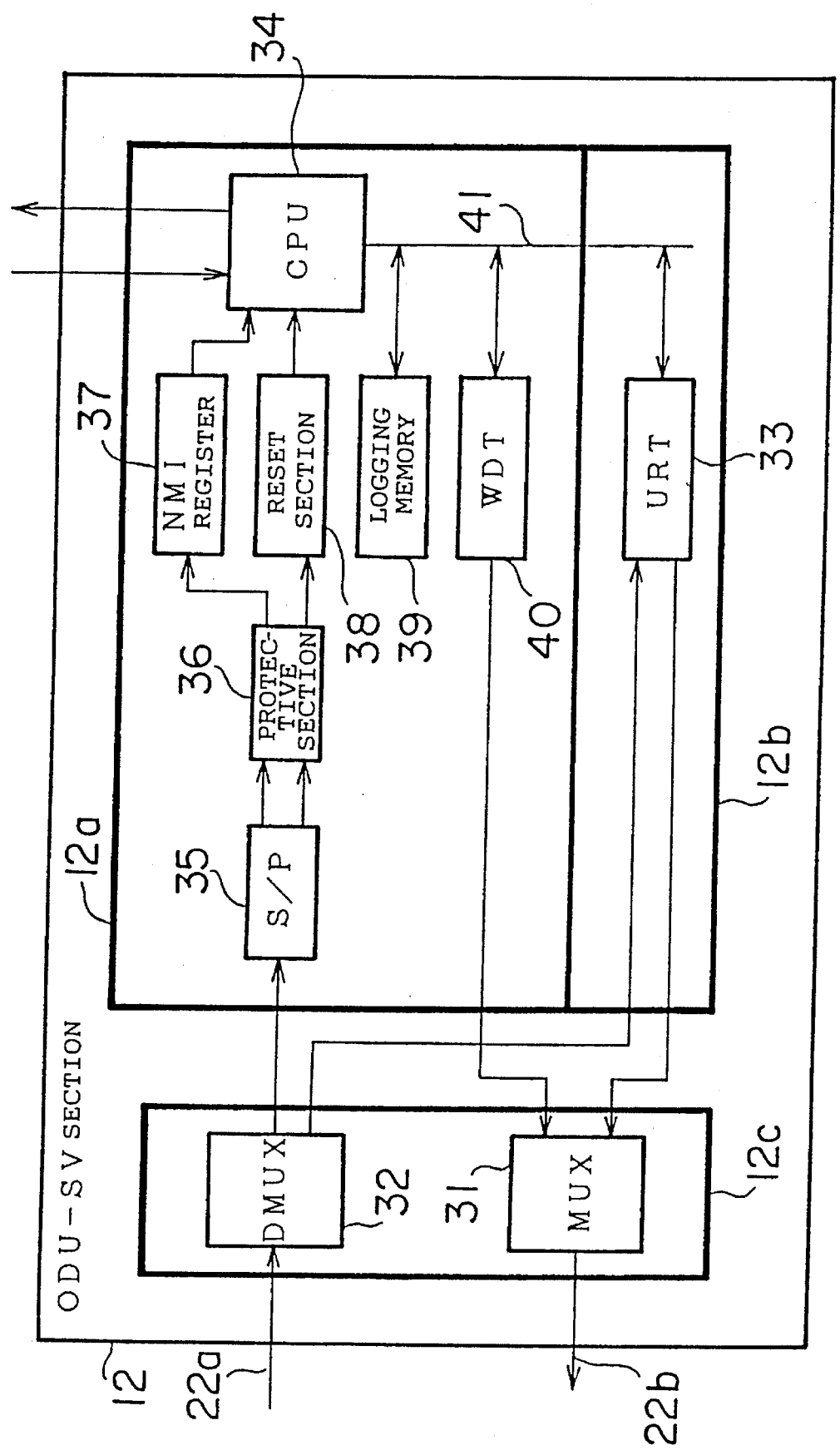
FIG. 5 is a block diagram illustrating a detailed configuration of the ODU-SV section shown in FIG. 4.

FIG. 5 is a block diagram explaining a detailed configuration of the ODU-SV section 12 shown in FIG. 4. In the figure, the multiplex/separate section 12c comprises a MUX 31 which executes a multiplex transmission, and a DMUX 32 which executes separation. The communication control section 12b is connected to the MUX 31 and the DMUX 32, and comprises a URT (Universal Receiver Transmitter) 33 which functions as a serial interface controller assisting a serial data transmission. The URT 33 may employ an asynchronous-type UART (Universal Asynchronous Receiver Transmitter) or a character synchronous-type USRT (Universal Synchronous Receiver Transmitter).

The supervisory control section 12a comprises a processor (CPU) 34 which monitors and controls the ODU communication device 11, a serial/parallel converter section (S/P) 35, a protective section 36 which takes n-stage protection, a NMI (Non-Maskable Interrupt) register 37, a reset section 38, a logging memory 39, a watchdog timer (WDT) 40, and a CPU bus 41. The serial/parallel converter section 35, to which an output of the DMUX 32 is supplied, converts the offline control signal or the CPU reset signal which is inputted as serial data into parallel data. The protective section 36 does not supply an output until the identical signal is repeatedly supplied n time (for example, four times) to a predetermined bit position of the serial data transmitted with a frame configuration. Further, the protective section is a protective network for taking n-stage protection against an erroneous operation caused by a noise, and detects the offline control signal and the CPU reset signal with the n-stage protection. When the offline control signal is outputted to the NMI register 37 and latched thereon, the processor 34 determines whether or not the offline control signal is interrupted. If it is determined as being the offline control signal, the NMI register 37 outputs an interruption signal NMI having high priority to the processor 34 so that the processor 34 executes offline control which will be described later. When the CPU reset signal is outputted to the reset section 38, the reset section 38 outputs a specified-width pulse, which is required for resetting the processor 34 to the initial state, to the processor 34. The logging memory is a storage memory recording a change of the operating state of the processor 34 for time series. When the watchdog timer 40 detects the fact that a specified-period signal, which should be transmitted from the processor 34, is not supplied within a predetermined time, it outputs the CPU alarm signal to the MUX 31.

Next, the operation of the remote control unit of the radio unit, constituted as above will be described below.

First, concerning the communication of a main signal, the DPU 16a of the IDU communication device 16 multiplexes a transmitting signal from low-order devices, and the multiplexed signal is modulated by means of the MODEM 16b, as shown in FIG. 4. Then, the IF section 16c amplifies the intermediate frequency, and outputs the amplified frequency to the ODU communication device 11 through the main signal communication line 21a. The IF section 11a of the ODU communication device 11 further amplifies intermediate frequency, and the RF section 11b amplifies high frequency, thus the signal being transmitted to another base station through the antenna 20.

On the other hand, when a signal transmitted from another base station is received by the antenna 20, the RF 11b amplifies high frequency, and the IF section 11a amplifies intermediate frequency, thus the signal being outputted to the IDU communication device 16 through the main signal communication line 21b. Then, the IF section 16c of the IDU communication device 16 further amplifies intermediate frequency, and the MODEM 16b demodulates it. Further, the signal multiplexed by the DPU 16a is separated and outputted to low-order devices.

Next, a supervisory control will be described below. As shown in FIG. 4, ordinarily, the supervisory control section 12a (processor 34 in FIG. 5) of the ODSSV section 12 monitors the ODU communication device 11, and executes independently predetermined control; on the other hand, the supervisory control section 17a of the IDU-SV section 17 monitors the IDU communication device 16, and executes predetermined control. Further, serial monitoring data (a voltage of each section of the ODU communication device 11, presence of an alarm, receiving power or the like) of the ODU communication device 11, is transmitted from the supervisory control section 12a (processor 34 in FIG. 5) of the ODU-SV section 12 to the supervisory control section 17a through the communication control section 12b (URT 33 in FIG. 5), multiplex/separate section 12c (MUX 31 in FIG. 5), communication control line 22b, multiplex/separate section 17c, and communication control section 17b. Based on this serial monitoring data, serial control data (control signal of transmitting power, etc.) is transmitted from an operator of the supervisory control section 17a of the IDU-SV section 17 to the supervisory control section 12a (processor 34 in FIG. 5) through the communication control section 17b, multiplex/separate section 17c, communication control line 22a, multiplex/separate section 12c (DMUX 32 in FIG. 5), and communication control section 12b (URT 33 in FIG. 5). Then, the supervisory control section 12a (processor 34 in FIG. 5) executes transmitting power control of the ODU communication device 11 on the basis of the transmitted serial control data.

An operation of the processor 34 constituting the supervisory control section 12a of the ODU-SV section 12 is also monitored, as shown in FIG. 5. In other words, in the case where a specified-period signal is not supplied from the processor 34 within a predetermined time, the watchdog timer 40 makes a decision that abnormality occurs in the processor 34, and outputs the CPU alarm signal to the MUX 31. Then, the MUX 31 multiplexes the serial monitoring data from the URT 33 and this CPU alarm signal, and transmits the multiplexed signal to the multiplex/separate section 17c shown in FIG. 4 through the communication control line 22b.

As shown in FIG. 4, the multiplex/separate section 17c separates the transmitted multiplex signal, and outputs the serial monitoring data to the communication control section 17b, and the CPU alarm signal to the supervisory control section 17a. An operator of the supervisory control section receiving the CPU alarm signal outputs the offline control signal in the case of clearing up the cause of abnormality, and the CPU reset control signal in the case of urgently rising the processor 34, from the supervisory control section 17a to the multiplex/separate section 17c. The multiplex/separate section 17c multiplexes the serial control data from the communication control section 17b and the offline control signal or the CPU reset control signal (in other words, this means that the offline control signal or the CPU reset control signal is added to each predetermined bit position of the frame configuration), and transmits the signal to the DMUX 32 shown in FIG. 5.

As shown in FIG. 5, the DMUX 32 separates the transmitted multiplex signal, and transmits the serial control data to the URT 33. Further, it transmits the offline control signal or the CPU reset control signal to the protective section 36 through the serial/parallel converter section 35. For example, when the protective section 36 detects the offline control signal n-time at a predetermined bit position in the frame configuration, it supplies an output signal to the NMI register 37. Then, the NMI register 37 outputs an interruption signal NMI, which can not be masked, to the processor 34. Thus, the processor 34 stops executing supervisory control software of the ODU communication device 11, which has been executed in online, and starts software for an offline control. Further, the processor waits for a transfer command signal from the URT 33, and transmits data of the logging memory 39 to the supervisory control section 17a of the IDU-SV section 17 shown in FIG. 4 through the URT 33 and the MUX 31. In the supervisory control section 17a, analysis of the cause of abnormality is made by an operator on the basis of time series data of the operating state of the processor 34 until abnormality occurs in the data of the logging memory 39, namely the processor 34. In other words, it is possible to predict what phenomenon occurs in the processor 34 on the basis of these data; for example, to find the fact that a bug exists in software.

Further, when the protective section 36 detects the CPU reset control signal n-time at the predetermined bit position in the frame configuration, it outputs an output signal to the reset section 38. Then, the reset section 38 outputs a reset signal to the processor 34. Thus, the processor 34 is reset to the initial state at the time when a power source is turned on, thereby a temporary recovery being performed.

As described above, if the supervisory control section 17a of the IDU-SV section 17 receives the CPU alarm signal from the watchdog timer 40 of the supervisory control section 12a of the ODU-SV section 12, no disconnection occurs in the communication control line 22b. If abnormality occurs in the processor 34, the supervisory control section 17a can readily specify it. Further, if monitoring data indicative of an operating state of the ODU communication device 11 is not supplied from the processor 34 to the supervisory control section 17a through the communication control line 22b, and if the supervisory control section 17a does not receive the CPU alarm signal from the watchdog timer 40, it can be readily seen that disconnection occurs in the communication control line 22b. Incidentally, when the fact that abnormality occurs in the processor 34 is specified, the offline control signal instructing a supply of logging information and the CPU reset control signal instructing a reset to the initial state to the processor 34, are outputted, thereby recovery measures being taken.

Next, the second embodiment will be described below in detail.

Figure 6:
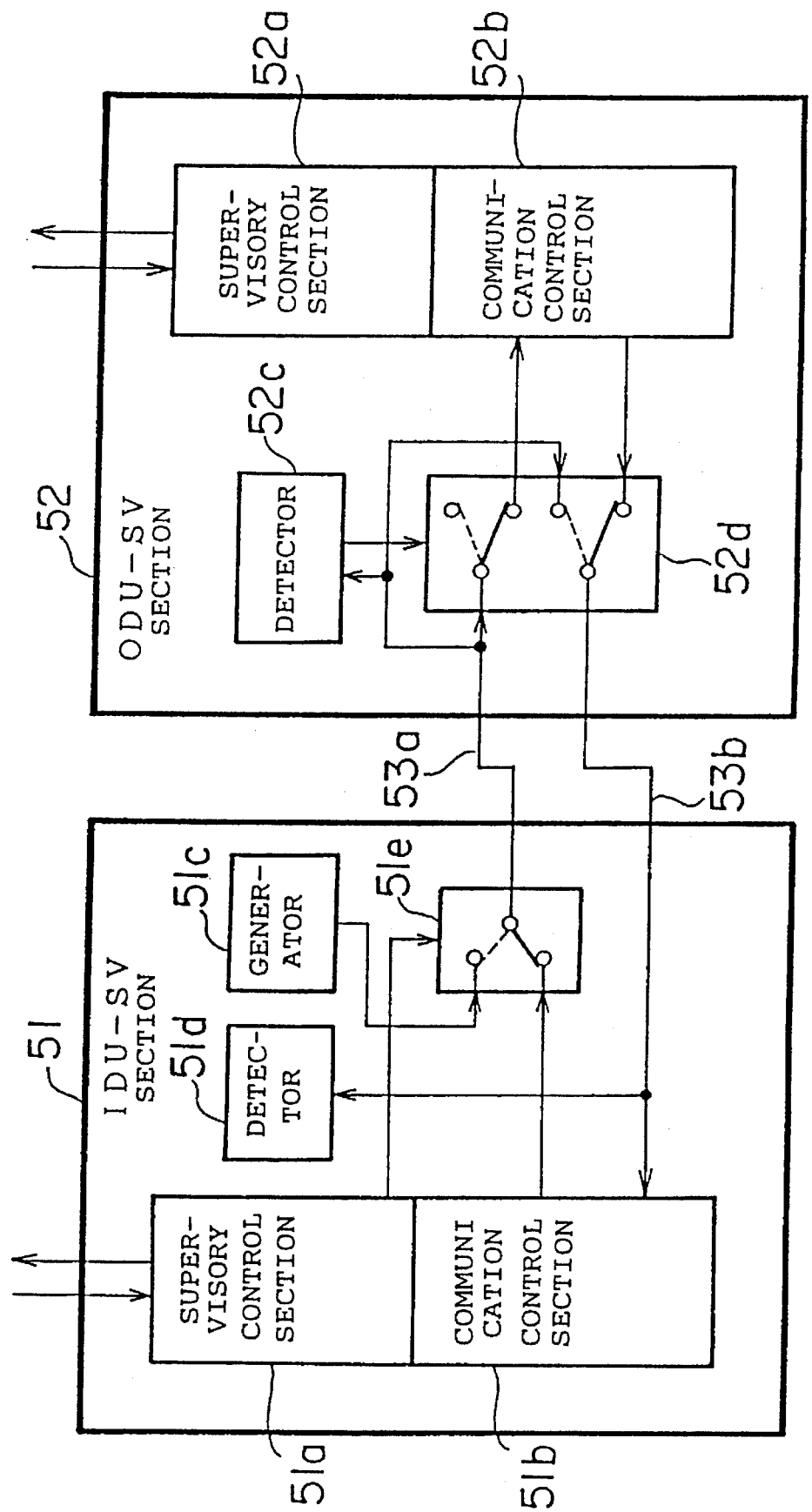
FIG. 6 is a block diagram of the remote control unit for a radio unit according to the second embodiment.

FIG. 6 shows the second embodiment, and is a block diagram of the remote control unit of the radio unit. In this figure, IDU and ODU communication devices are omitted, and only IDU-SV and ODU-SV sections are illustrated. The IDU and ODU communication devices of the second embodiment have the same configuration as the IDU and ODU communication devices 16 and 11 shown in FIG. 4.

In FIG. 6, an ODU-SV section 52 is composed of a supervisory control section 52a, a communication control section 52b, a detector 52c for a test pattern signal, and a change-over switch 52d. The supervisory control section 52a executes monitoring of a voltage or the like of each section in the ODU communication device, monitoring of occurrence of an alarm, monitoring of a receiving power, a control of a transmitting power, or the like according to the control of a supervisory control section 51a of an IDU-SV section 51 which will be described later. The communication control section 52b interfaces a transmission/reception of a serial signal between the supervisory control section 52a and the supervisory control section 51a of the IDU-SV section 51. This serial signal includes monitoring and control data. The detector 52c is connected with a communication control line 53a, and detects a test pattern signal transmitted from a generator 51c, which will be described later, of the IDU-SV section 51. If the detector detects the signal, it outputs a change-over signal to the changeover switch 52d. The change-over switch 52d is located on the way of communication control lines 53a and 53b connecting the communication control section 52b with a communication control section 51b, which will be described later, of the IDU-SV section 51. Ordinarily, the change-over switch is connected to a switch position illustrated by a solid line in FIG. 6. However, if a change-over signal is outputted from the detector 52c, the switch 52d is connected to a switch position illustrated by a broken line in FIG. 6 so that the communication control line 53a is connected to the communication control line 53b.

The IDU-SV section 51 is composed of a supervisory control section 51a, a communication control section 51b, a generator 51c for a test pattern signal, a detector 51d for a test pattern signal, and a change-over switch 51e. The supervisory control section 51a monitors and controls the IDU communication device, and further monitors and controls the ODU communication device through the supervisory control section 52a of the ODU-SV section 52. The communication control section 51b controls the communication between the supervisory control section 51a and the supervisory control section 52a of the ODU-SV section 52. The generator 51c is a test pattern signal generator generating a serial pattern signal which does not exist in the communication between the supervisory control sections 51a and 52a. The detector 51d is connected with the communication control line 53b, and is a detector for detecting a test pattern signal transmitted through the aforesaid line. The change-over switch 51e is located on the way of the communication control line 53a, and is ordinarily connected to a switch position illustrated by a solid line in FIG. 6. However, the switch is connected to a switch position illustrated by a broken line in FIG. 6 by means of a change-over signal from the supervisory control section 52a, thus a test pattern signal from the generator 51c being supplied to the communication control line 53a.

Each operation of IDU-SV section 51 and ODU-SV section 52, constituted as above, is described below. Incidentally, each operation of IDU and ODU communication devices of the second embodiment is the same operation as IDU and ODU communication devices 16 and 11 shown in FIG. 4, so that its explanation is omitted.

In the case where the supervisory control section 51a of the IDU-SV section 51 receives serial monitoring data from the supervisory control section 52a of the ODU-SV section 52 through the communication control line 53, the supervisory control section 51a does not output a change-over signal to the change-over switch 51e. Therefore, the change-over switch 51e is connected to a switch position illustrated by a solid line in FIG. 6, so that a test pattern signal from the generator 51c is not outputted to the communication control line 53a. For this reason, the test pattern signal is not detected by means of the detector 52c of the ODU-SV section 52, so that a change-over signal is not outputted to the changeover switch 52d. Therefore, the change-over switch 52d is connected to a switch position illustrated by a solid line in FIG. 6, thereby the communication control sections 51b and 52b being in a connected state through the communication control lines 53a and 53b. Thus, a usual transmission/reception of serial monitoring and control data is performed.

On the other hand, in the case where the supervisory control section 51a of the IDU-SV section 51 can not receive serial monitoring data from the supervisory control section 52a of the ODU-SV section 52, the supervisory control section 51a outputs a change-over signal to the change-over switch 51e so that the change-over switch 51e can be connected to a switch position illustrated by a broken line in FIG. 6. Therefore, a test pattern signal is outputted from the generator 51c to the communication control line 53a, and the detector 52c detects the test pattern signal, thus a change-over signal being outputted to the change-over switch 52d. Then, when the change-over switch 52d is connected to a switch position illustrated by a broken line in FIG. 6, the test pattern signal from the generator 51c is returned and transmitted to the detector 51d through the communication control line 53b. Thus, the detector 51d can detect the test pattern signal.

In other words, the fact that the detector 51d detects the test pattern signal means that no disconnection occurs in the communication control lines 53a and 53b. Therefore, it can be specified that the reason, why the supervisory control section 51a of the IDU-SV section 51 can not receive serial monitoring data from the supervisory control section 52a of the ODU-SV section 52, lies in the ODU-SV section 52. If the detector 51d does not detect test pattern signal, disconnection occurs in the communication control line 53b. Therefore, it can be readily concluded that the supervisory control section 51a of the IDU-SV section 51 can not receive serial monitoring data from the supervisory control section 52a of the ODU-SV section 52.

As described above, according to the first embodiment of the present invention, if abnormality occurs in an operation of supervisory control means, an alarm signal is transmitted to the remote control unit through communication control lines. Therefore, if the remote control unit receives this alarm signal, this means that no disconnection occurs in the communication control lines. Thus, it can be readily specified that abnormality occurs in the supervisory control means. On the other hand, if data indicative of an operating state of a radio unit is not transmitted from supervisory control means to a remote control unit through communication control lines, and if an alarm signal is not received, it can be readily specified that disconnection occurs in communication control lines.

Further, when the remote control unit receives an alarm signal, it gives instructions to supervisory control means. The instructions include, for example, a transmission of logging information, a reset to the initial state or the like. Thus, suitable recovery measures can be taken quickly.

According to the second embodiment of the present invention, if data indicative of an operating state of a radio unit is transmitted from a supervisory control unit to a remote control unit through communication control lines, the remote control unit transmits test pattern signal to the supervisory control unit through the communication control lines, and returns it to the supervisory control unit. If the test pattern signal is returned, this means that no disconnection occurs in the communication control line. Therefore, it can be specified that abnormality occurs in the supervisory control unit. On the other hand, if the test pattern signal is not returned, it can be specified that disconnection occurs in the communication control lines.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A remote control method for a radio unit by a supervisory control unit which is located in the vicinity of the radio unit, and monitors and controls an operating state of the radio unit, and a remote control unit which is connected to the supervisory control unit through a communication control line, and controls the radio unit through the supervisory control unit, the method comprising the steps of:

transmitting an alarm signal indicative of abnormality of an operation of said supervisory control unit from said supervisory control unit to said remote control unit via said communication control line; and making a decision that abnormality occurs in said supervisory control unit or said communication control line when said alarm signal is received by said remote control unit.

2. A remote control method for a radio unit by a supervisory control unit which is located in the vicinity of the radio unit, and monitors and controls an operating state of the radio unit, and a remote control unit which is connected to the supervisory control unit through a communication control line, and controls the radio unit through the supervisory control unit, the method comprising the steps of:

transmitting an alarm signal indicative of abnormality of an operation of said supervisory control unit from said supervisory control unit to said remote control unit via said communication control line;

transmitting an abnormality processing signal from said remote control unit to said supervisory control unit through said communication control line, when said alarm signal is received by said remote control unit; and executing a step of abnormality processing in accordance with said received abnormality processing signal.

3. A remote control method for a radio unit according to claim 2, wherein in the case where said abnormal processing signal is an offline control signal, said processing is to transmit logging information of said supervisory control unit, until said alarm signal is given, to said remote control unit through said communication control line.

4. A remote control method for a radio unit according to claim 2, wherein in the case where said abnormality processing signal is a reset control signal, said processing is to reset said supervisory control unit to an initial state.

5. A remote control system for a radio unit for monitoring and controlling said radio unit, the system comprising:

a supervisory control unit located in the vicinity of said radio unit and including:

supervisory control means which monitors and controls an operating state of said radio unit, alarm detecting means which monitors an operation of said supervisory control means and transmits an alarm signal through a communication control line when abnormality occurs in the operation of said supervisory control means, and abnormality processing means which receives an abnormality processing signal and executes an abnormality processing in accordance with said received abnormality processing signal; and a remote control unit located remotely from said supervisory control unit and including:

remote control means which prepares a signal for controlling said radio unit on the basis of data indicative of an operation state of said radio unit, transmitted through said communication control line, and transmits the signal to said supervisory control means through said communication control line; and abnormality processing signal outputting means which receives the alarm signal transmitted from said alarm detecting means, and transmits the abnormal processing signal through said communication control line to said abnormality processing means.

6. A remote control system for a radio unit according to claim 5, wherein in the case where said abnormality processing signal is an offline control signal, said abnormality processing means is constituted so as to transmit logging information of said supervisory control unit, until said alarm signal is given, to said remote control unit through said communication control line.

7. A remote control system for a radio unit according to claim 5, wherein in the case where said abnormality processing signal is a reset control signal, said abnormality processing means is constituted so as to reset said supervisory control unit to an initial state.

* * * * *